United States Patent Office 2,892,836
Patented June 30, 1959

2,892,836

CYANINE DYES

George de Stevens, Portland, Conn., assignor to Sperry Rand Corporation, New York, N.Y., a corporation of Delaware No Drawing. Application August 22, 1955
Serial No. 529,961

13 Claims. (Cl. 260—240.4)

This invention relates to the preparation of 7-chloro-6-keto-spiro (4.5) decane, 2-methyl-spiro (4.5) decano (6,7d) thiazole and its quaternary salts, and to cyanine dyes prepared from these cyclic ammonium salts.

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain.

I have now found that it is possible to prepare cyanine dyes in which one or both of the above mentioned auxochromic nitrogen atoms lie in a spiro (4.5) decano (6,7d) thiazole nucleus. I have further found that these new cyanine dyes sensitize photographic emulsions strongly and cleanly, i.e. without producing excessive fog or residual dye stain.

It is accordingly an object of my invention to provide new cyanine dyes. A further object is to provide photographic emulsions sensitized with such dyes. Other objects will appear hereinafter.

As starting material for the preparation of my new dyes I employ 2-alkyl-spiro (4.5) decano (6,7d) thiazole, particularly 2-methyl spiro (4.5) decano (6,7d) thiazole. I first convert the alkyl spiro (4.5) decano (6,7d) thiazole to quaternary salts by reacting the base with esters, such as alkyl halides, alkyl sulfates, or alkyl-p-toluene sulfonates, for example. For purposes of convenience the quaternary salts useful in practicing this invention can be represented by the following single formula:

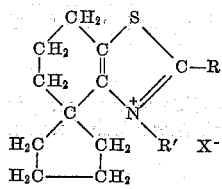

wherein R' represents an alkyl group, e.g. methyl, ethyl, n-propyl, isobutyl, n-butyl, β-hydroxyethyl, β-methoxyethyl, β-ethoxyethyl, β-acetoxyethyl, β-carboxyethyl, carboxymethyl, β-carbomethoxyethyl, β-carbethoxyethyl, allyl, etc. or an aralkyl group, e.g. benzyl, phenyl, ethyl, etc. R represents methyl, ethyl or n-propyl and X⁻ represents an anion, e.g. chloride, bromide, iodide, benzene sulfonate, p-toluene sulfonate, methyl sulfate, ethyl sulfate, thiocyanate perchlorate, acetate, etc.

To prepare pseudocyanine dyes from such quaternary salts I react the quaternary salts with α-halogenoquinoline quaternary salts, in the presence of an acid binding agent, such for example, as sodium ethylate, sodium carbonate, pyridine or a strong organic base (e.g. triethylamine, trimethylamine and N-methylpiperidine). I have found it advantageous to employ a mixture of pyridine with a strong tertiary organic base.

Instead of 2-halogenoquinoline quaternary salts I can employ 2-alkyl mercapto or 2-aryl mercaptoquinoline quaternary salts to condense with the quaternary salts of 2-alkyl spiro (4.5) decano (6,7d) thiazole in the presence of an acid binding agent.

Using 2-halogenopyridine quaternary salts instead of 2-halogenoquinoline quaternary salts I can prepare pyridocyanine dyes containing a spiro (4.5) decano (6,7d) thiazole nucleus.

Using 2-alkyl mercapto or 2-aryl mercaptobenzothiazole or naphthothiazole salts I can prepare simple cyanine dyes other than pseudocyanine dyes.

To prepare symmetrical carbocyanine dyes from 2-alkyl spiro (4.5) decano (6,7d) thiazole quaternary salts, I react the quaternary salts with esters of ortho acids, e.g. ethyl orthoformate, ethyl orthoacetate, ethyl orthopropionate and ethyl orthobenzoate in the presence of pyridine or a mixture of pyridine and triethylamine.

To prepare unsymmetrical carbocyanine dyes from 2-alkyl spiro (4.5) decano (6,7d) thiazole quaternary salts I react the quaternary salts with cycloammonium quaternary salts containing a β-aryl aminovinyl group in the alpha or gamma position, i.e. in one of the so-called reactive positions in the presence of an acid binding agent, e.g. pyridine or pyridine plus triethylamine.

To prepare styryl dyes from my new quaternary salts I condense them with p-dialkyl aminobenzaldehyde in the presence of an alkaline catalyst, e.g. piperidine in absolute ethanol solution.

To prepare merocarbocyanine dyes from 2-alkyl spiro (4.5) decano (6,7d) thiazole quaternary salts I condense the quaternary salts with ketomethylene heterocyclic intermediates containing an aryl aminomethylene group in the 5-position in the presence of an acid binding agent, e.g. pyridine plus triethylamine. Examples of such ketomethylene intermediates are 5-acetanilidomethylene-3-ethyl rhodanine, 5-acetanilidomethylene-3-ethyl-1-phenyl-2-thiohydantoin, etc.

To sensitize photographic silver halid emulsions with my new dyes, I disperse the dyes in the emulsions. My invention is particularly directed to the customarily employed gelatino-silver-halide emulsions, such as the gelatino-silver-bromide, bromiodide, chloride and chlorobromide for example. The methods of incorporating dyes in emulsions are simple and well known to those skilled in the art and described in various patents and publications, for example, U.S. Patent 2,336,843, patented December 14, 1943.

Zelinskii (Compt. rend. acad. Sci. USSR 49, 568 (1945); C.A. 40, 6058 (1946)) has reported the synthesis of 6-ketospiro (4.5) decane (I) from 1,1'-dihydroxy bicyclopentyl.

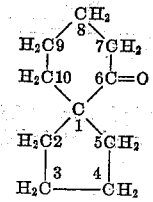

I have discovered that this spirane can be chlorinated at position 7 to give 7-chloro-6-keto-spiro (4.5) decane II. I have also found that compound II reacts with thioacetamide to yield 2-methyl-spiro (4.5) decano (6,7d) thiazole (III).

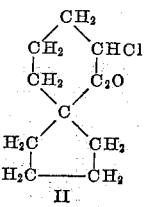
II

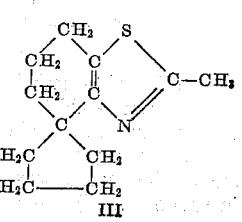
III

A unique feature of this thiazole is that the spatial configuration of the five membered ring is perpendicular to the six membered ring.

The following examples will serve to demonstrate the manner of preparation of my new base, quaternary salts and dyes. These examples are not, however, intended to limit my invention.

*Example I.—7-chloro-6-keto-spiro (4.5) decane*

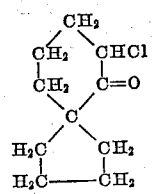

To a mixture of 20 g. (0.145 moles) of 6-keto spiro (4.5) decane, 7.4 g. (0.07 mole) of calcium carbonate and 40 cc. of water was added chlorine gas maintaining the temperature at 25°–30° C. until the calcium carbonate was dissolved. The two phase mixture was then extracted with ether and the ether extract was dried over $CaCl_2$. After removal of the ether, the residual oil was distilled at reduced pressure. There was very little fore-run. The main fraction was collected at 160°–166°/25 mm. in 65% yield.

*Example II.—2-methyl spiro (4.5) decano (6,7d) thiazole*

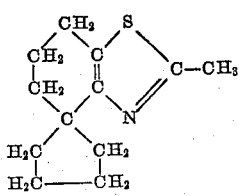

A mixture of 17 g. (1 mol.) of 7-chloro-6-keto spiro (4.5) decane and 7.4 g. (1 mol.) of thioacetamide was heated slowly up to 100° C. A vigorous reaction ensued which was controlled by external cooling, the temperature not rising above 120° C. The mixture was then heated on the steam bath for 30 minutes, chilled, and acidified with 150 cc. of 5% hydrobromic acid solution. After thoroughly extracting the acidified solution with ether, it was made alkaline with ammonium hydroxide and this alkaline solution was extracted with ether. The ether extract was dried over $K_2CO_3$. After removal of the ether, the residual oil was distilled at reduced pressure, the thiazole distilling at 120°–122° C./1 mm. The yield was 35% of theoretical.

*Example III.—2-methyl spiro (4.5) decano (6,7d) thiazole ethiodide*

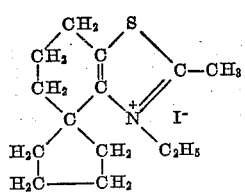

6 g. (1 mol.) of 2-methyl spiro (4.5) decano thiazole and 6 g. (1 mol. +20% excess) of ethyl iodide were refluxed for four days. After chilling and washing well with ether, the crystals were triturated with acetone, collected at the pump, washed again with acetone and dried in vacuo M.P. 188°–192° d. 50% yield.

*Example IV.—2-methyl spiro (4.5) decano (6,7d) thiazole methiodide*

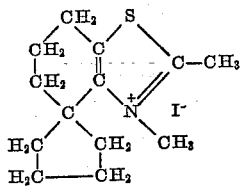

5.0 g. (1 mol.) of 2-methyl spiro (4.5) decano (6,7d) thiazole and 5.0 g. (1 mol. +30% excess) of methyl iodide were refluxed for 40 hours. An orange colored solid was obtained which was washed well with ether. Trituration with acetone resulted in the formation of a white crystalline solid in 60% yeld. After recrystallization from acetone, the material melted at 205°–207°.

*Analysis.*—Calcd. for $C_{13}H_{20}NSI$: N, 4.01; S, 9.18. Found: N, 3.94; S, 9.10.

*Example V.—3,3'-dimethyl-bis (4.5) spiro decano (6,7d) thiazolo-carbocyanine iodide*

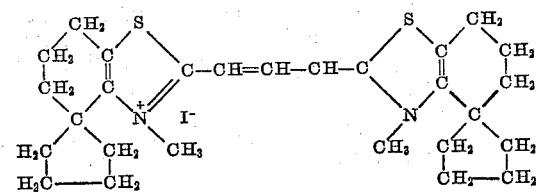

2.0 g. (1 mol.) of 2-methyl spiro (4.5) decano (6,7d) thiazole methiodide, 0.92 g. (1 mol. +10% excess) of ethyl orthoformate, 15 cc. of pyridine and 1.0 g. of triethyl amine were refluxed four and one-half hours. After chilling, 400 cc. of ether was added to the solution. The ether was decanted and the viscose residue was washed well with fresh portions of ether, then water and finally taken up in acetone. Water was added to the acetone solution whereupon the dye precipitated. The crystals were collected on a filter and washed well with water. Two recrystallizations from 10% aqueous ethyl alcohol gave a 3% yield of pure dye in the form of tiny bronze crystals melting at 193°–195° d. A methanol solution of the dye was reddish purple with an absorption maximum at 570 mu.

*Example VI.—1',3-diethyl oxaspiro (4'.5') decano (6',7'd) thiazolocarbocyanine iodide*

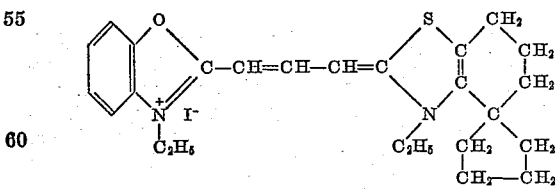

1.2 g. (1 mol.) of 2-methyl spiro (4.5) decanothiazole ethiodide, 1.7 g. (1 mol.) of 2-β-acetanilidovinyl benzoxazole ethiodide, 10 cc. of absolute ethyl alcohol and 1 g. of triethylamine were refluxed 30 minutes. After chilling overnight, the crystals were collected on a filter, washed well with water, then acetone and air dried. The yield of crude dye was 51%. After two recrystallizations from methanol (20 cc. per gram) a 40% yield of pure dye was obtained in the form of red crystals (M.P. 266°–268° d.) with a silver reflux. A methanol solution of the dye gave an orange red color with an absorption maximum at 516 mu.

*Example VII.—1,1'-diethyl spiro (4.5) decano (6,7d) thiazolo-2'-cyanine iodide*

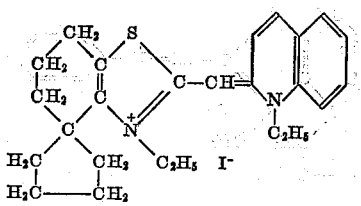

A mixture of 1.0 g. (1 mol.) of 2-methyl spiro (4.5) decanothiazole ethiodide, 1 g. (1 mol.) of 2-iodoquinoline ethiodide, 10 cc. of absolute ethyl alcohol and 1 g. of triethylamine were refluxed for 45 minutes. After chilling overnight, the dye crystals were collected at the pump, washed well with water, then acetone and air dried. A 52% yield of crude dye was obtained. After two recrystallizations from methanol (25 cc. per gram) a 30% yield of pure dye was obtained in the form of bright red needles. A methanol solution of the dye gave a yellow color and had an absorption maximum at 476 mu.

*Example VIII.—3-ethyl-5[(1-ethyl spiro (4.5) decano (6,7d) (1,2) thiazolylidene)-ethylidene]rhodanine*

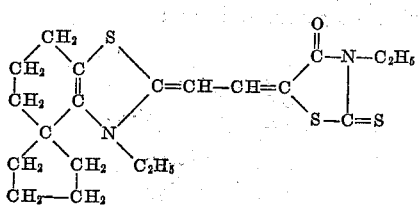

To 1.2 g. (1 mol.) of 2-methyl spiro (4.5) decanothiazole ethiodide and 1.1 g. (1 mol.) of 5-acetanilidomethylene-3-ethyl rhodanine were added 10 cc. of absolute ethyl alcohol and 1 g. of triethylamine. This mixture was refluxed for 30 minutes. After chilling overnight, the crystals were collected on a filter and washed well with acetone, then water and air dried to give a 54% yield of crude dye. After two recrystallizations from methanol (500 cc. per gram) a 47% yield of pure dye in the form of glittering green needles was obtained, M.P. 238°–239° d. A methanol solution of the dye gave a deep red color with an absorption maximum at 550 mu.

*Example IX.—2-p-dimethylaminostyryl spiro (4.5) decano (6,7d) thiazole methiodide*

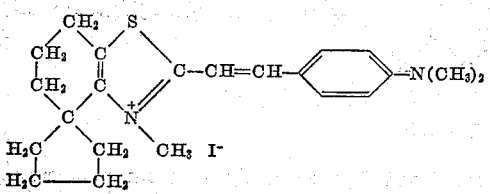

1.0 g. (1 mol.) of 2-methyl spiro (4.5) decano (6,7d) thiazole methiodide, 0.426 g. (1 mol.) of p-dimethyl aminobenzaldehyde, 10 cc. of absolute ethyl alcohol and 1 drop of piperidine were refluxed for 45 minutes. The dye crystals which separated on chilling were collected on a Buchner funnel and washed well with water, then acetone, and air dried. Two recrystallizations from methanol (30 cc. per gram) gave a 53% yield of pure dye in the form of long garnet needles melting at 232°–233° d. A methanol solution of the dye was yellowish orange in color with an absorption maximum at 470 mu.

It is well known that cyanine dyes resonate between two extreme forms and that a cyanine dye can be represented by either of the two extreme forms. Thus, the unsymmetrical type of instant dyes can be represented by either of the following formulas.

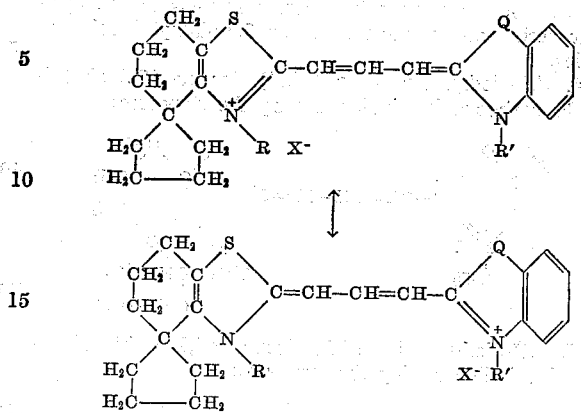

The features of novelty which I believe to be characteristic of my invention are set forth with particularity in the following claims. It should be understood, however, that modifications and changes may be made, without departing from the spirit and substance of my invention, as will be apparent to those skilled in the art.

What I claim as my invention and desire to be secured by Letters Patent of the United States is:

1. A dye selected from the group characterized by the following general formula:

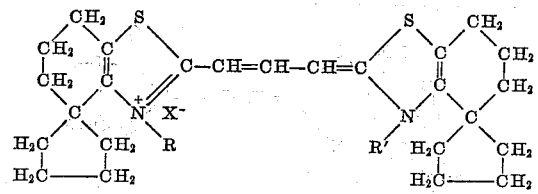

where R and R' respectively represent members selected from the group consisting of alkyl and aralkyl groups, and $X^-$ represents an acid radical.

2. 3,3'-dimethyl-bis (4,5) spiro decano (6,7d) thiazole-carbocyanine iodide having the following structure:

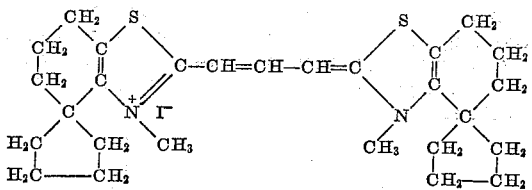

3. A dye selected from the group characterized by the following general formula:

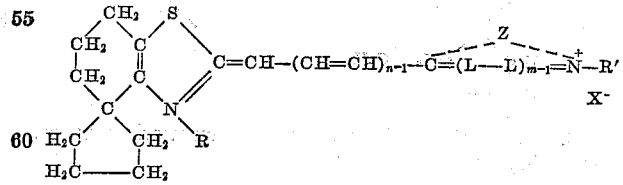

where R and R' respectively represent members selected from the group consisting of alkyl and aralkyl groups, $m$ represents a positive integer from 1 to 2, $n$ represents a positive integer from 1 to 3, L represents a methine group, $X^-$ represents an acid radical and Z represents the nonmetallic atoms necessary to complete a heterocyclic nucleus containing from 5 to 6 atoms in the heterocyclic ring, said heterocyclic nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series.

4. 1',3-diethyl oxa spiro (4',5') decano (6',7'd) thiazolo carbocyanine iodide having the structure:

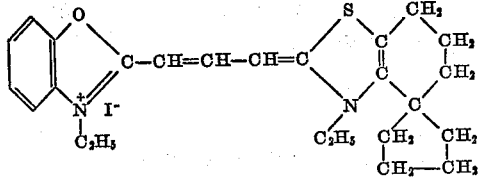

5. 1,1'-diethyl spiro (4,5) decano (6,7d) thiazole-2'-cyanine iodide having the structure:

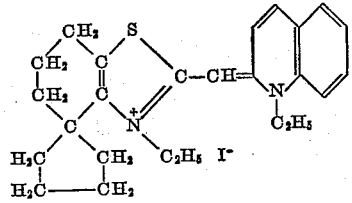

6. A dye selected from the group characterized by the following general formula:

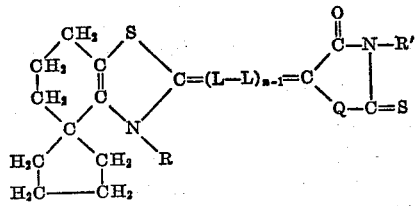

where R is a member selected from the group consisting of alkyl and aralkyl groups, R' is a member selected from the group consisting of alkyl, aralkyl, and aryl groups, L is a methine group, $n$ is a positive integer of from 1 to 4 and Q is a member selected from the group consisting of oxygen, sulfur, selenium and $=N-R'$.

7. 3-ethyl-5-[(1-ethyl spiro (4,5) decano (6,7d) 1 (2) thiazolylidene) ethylidene]rhodanine having the structure:

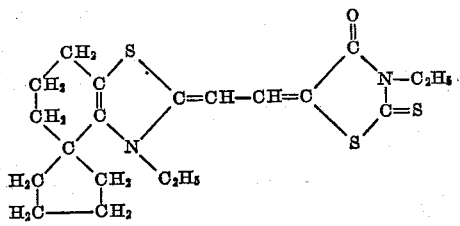

8. A dye selected from the group characterized by the following general formula:

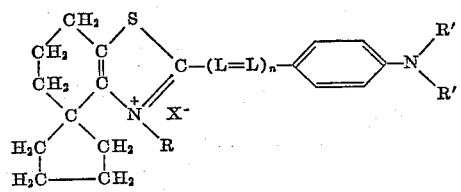

where R and R' represent a member selected from the group consisting of alkyl and aralkyl groups, L represents a methine group, $n$ is a positive integer from one to two, and X$^-$ represents an acid radical.

9. 2-p-Dimethyl aminostyryl spiro (4,5) decano (6,7d) thiazole methiodide having the following structure:

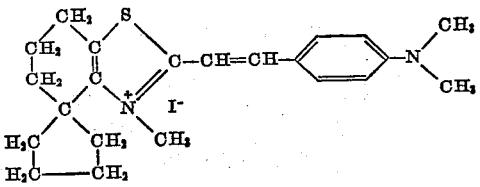

10. A process for preparing symmetrical carbocyanine dyes having the general formula:

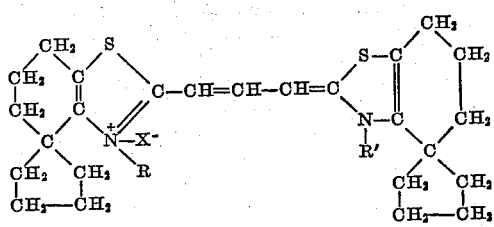

where R and R' respectively represent members selected from the group consisting of alkyl and aralkyl groups, and X$^-$ represents an acid radical from a quaternary salt having the general formula:

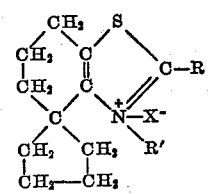

where R represents an alkyl radical $C_NH_{2N+1}$, N is a positive integer selected from the group, one to three, both inclusive and R' represents a member selected from the group consisting of alkyl and aralkyl groups and X$^-$ represents an anion comprising condensing the quaternary salt with an ester of an orthocarboxylic acid in an alkaline medium containing at least one constituent selected from the group consisting of pyridine and a mixture of pyridine and triethylamine.

11. A process for preparing unsymmetrical cyanine dyes having the general formula:

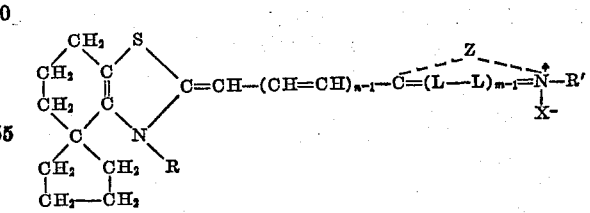

where R and R' respectively represent members selected from the group consisting of alkyl and aralkyl groups, $m$ represents a positive integer from 1 to 2, $n$ represents a positive integer from 1 to 3, L represents a methine group, X represents an acid radical and Z represents the non-metallic atoms necessary to complete a heterocyclic nucleus containing from 5 to 6 atoms in the heterocyclic ring, said heterocyclic nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series from a quaternary salt having the general formula:

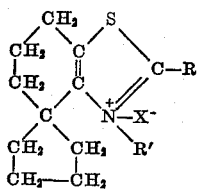

where R represents an alkyl radical $C_NH_{2N+1}$, N is a positive integer selected from the group, one to three, both inclusive and R' represents a member selected from the group consisting of alkyl and aralkyl groups and X⁻ represents an anion comprising condensing said quaternary salt with a heterocyclic ammonium quaternary salt having a reactive constituent selected from the group consisting of aryl aminovinyl groups, aryl aminobutadienyl groups, halogen atoms and thioether groups in a position selected from the alpha and gamma positions with respect to the nitrogen atom in the heterocyclic ring of said heterocyclic ammonium quaternary salt in the presence of an alkaline condensing agent.

12. A process for preparing merocarbocyanine dyes containing the spiro (4,5) decano (6,7d) thiazole nucleus and having the general formula:

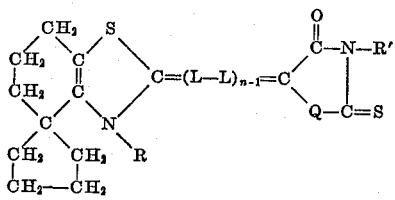

wherein R represents a member selected from the group consisting of alkyl and aralkyl groups, R' represents a member selected from the group consisting of alkyl, aralkyl and aryl groups, L is a methine group, n is a positive integer from 1 to 4 and Q is a member selected from the group consisting of oxygen, sulfur, selenium and =N—R' comprising condensing a quaternary salt having the general formula:

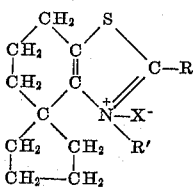

where R represents an alkyl radical $C_NH_{2N+1}$, N is a positive integer selected from the group, one to three, both inclusive and R' represents a member selected from the group consisting of alkyl and aralkyl groups and X⁻ represents an anion with a ketomethylene heterocyclic compound having the ketomethylene heterocyclic ring of said merocarbocyanine dye and having a reactive arylaminomethylene group in the 5-position with respect to the member represented by Q in the depicted general formula for said merocarbocyanine dye in an alkaline medium.

13. A process for preparing styryl dyes containing the spiro (4,5) decano (6,7d) thiazole nucleus and having the general formula:

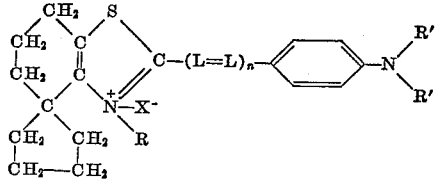

where R and R' respectively represent a member selected from the group consisting of alkyl and aralkyl groups, L represents a methine group, n is a positive integer from 1 to 2 and X⁻ represents an anion comprising condensing a quaternary salt having the general formula:

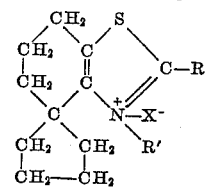

where R represents an alkyl radical $C_NH_{2N+1}$, N is a positive integer selected from the group, one to three, both inclusive and R' represents a member selected from the group consisting of alkyl and aralkyl groups and X⁻ represents an acid radical with p-dialkyl aminobenzaldehyde in the presence of an alkaline catalyst.

References Cited in the file of this patent
UNITED STATES PATENTS

| | | |
|---|---|---|
| 1,970,656 | Johnson | Aug. 21, 1934 |
| 2,066,966 | Dieterle | Jan. 5, 1937 |
| 2,066,968 | Dieterle | Jan. 5, 1937 |
| 2,112,140 | Brooker | Mar. 22, 1938 |
| 2,179,990 | Beilenson | Nov. 14, 1939 |
| 2,194,179 | Buchman | Mar. 19, 1940 |
| 2,336,463 | Brooker et al. | Dec. 14, 1943 |
| 2,336,843 | Brooker et al. | Dec. 14, 1943 |
| 2,423,217 | Anish et al. | July 1, 1947 |

OTHER REFERENCES

C.A., 16, 3101 (Copy in Sci. Lib.) (Abstract of Brit. Med. Journal, 1922, I, 514–5).

C.A., 19, 530 (Copy in Sci. Lib.) (Abstract of Proc. Roy. Soc. London, 96B, 317–33, 1924).

Clerc: "Photography Theory and Practice," 3rd ed., page 151, Pitman Pub. Corp., N.Y., 1952. (Copy in Div. 60.)